United States Patent Office 3,121,707
Patented Feb. 18, 1964

3,121,707
PEPTIDE SYNTHESIS USING N-N' CARBONYLDI-IMIDAZOLE ACTIVATOR
George W. Anderson, Riehen, Switzerland, and Rolf Paul, Riverdale, N.J., assignors to American Cyanamid Company, New York, N.Y., a corporation of Maine
No Drawing. Filed Nov. 23, 1960, Ser. No. 71,149
10 Claims. (Cl. 260—112)

This invention relates to an improved process for organic synthesis and more particularly for the synthesis of peptides and some new intermediates therefor.

In the synthesis of peptides, it is customary to block the amino group of one amino acid or of a simple peptide and the carboxyl group of the other. For example, the amino group can be temporarily masked or blocked by a group such as, for example, the carbobenzoxy group, phthaloyl group, tertiary butyloxycarbonyl group and the like. It is common to mask the carbonyl group of the other amino acid or in the case of uniting an amino acid to a peptide, one of them by esterification for which the lower alkyl group, such as methyl, ethyl, propyl, butyl, etc., are suitable. Because of its cheapness, it is customary to use the ethyl ester. Alkali metal salts of amino acids or peptides may sometimes be used, but the yields are generally lower.

The reaction is carried out by temporarily linking the free carboxyl group of the N-acylated amino acid or peptide with certain organic bases to form an activated amide. It has been speculated that this configuration produces a more energy rich grouping which facilitates the peptide reaction. It is with this type of peptide reaction that the present invention deals.

Among amide groupings which have been proposed or investigated in the prior art is a substituted imidazole, L-histidine. This procedure, although capable of operation, is practically useless as the difficulty of preparing the compounds and the yields are so low, well below 50%, that the process is only of academic interest.

The present invention is a continuation-in-part of our copending application Serial No. 761,288, filed September 16, 1958, now abandoned.

The present invention resides in a novel and greatly improved method of producing activated amides with imidazole or benzimidazole in excellent yield and contrary to the histidine experiment, a practical process becomes possible. The compound used to introduce the imidiazole or benzimidazole grouping is N,N'-carbonyldiimidazole or di-benzimidazole. The compound reacts readily with acyl-amino acids or N-acyl peptides. Carbon dioxide is split off during the acylation and the acyl imidazoles or benz-imidazoles are produced rapidly and in excellent yield. We believe that possibly the carbon dioxide formation may constitute a driving force and hence increase reaction speed and yields. Although we feel that the carbon dioxide liberation is probably performing a real function, it is not desired to limit the invention to this particular theory or mechanism.

Certain of the acyl amino acid imidazole compounds produced as intermediates and the corresponding compounds from N-acyl peptides are new chemical compounds and constitute important intermediates and therefore form a specific part of the present invention. These intermediates can be prepared by other methods although up to the present, the use of the N,N'-carbonyldiimidazoles is so much more efficient that it is the preferred method. The imidazole intermediates are excellent intermediates in peptide synthesis, the imidazole group of course being split off as the peptide is formed.

The particular amino acids to which the present invention is directed are the naturally occurring α-amino acids described, for example, by P. Karrer, Organic Chemistry, Second English edition, Elsevier Publishing Company, Inc., New York, 1946. Among the naturally occurring amino acids may be mentioned, for example, alanine, serine, aminobutyric acid, cystine, methionine, valine, norleucine, leucine, isoleucine, phenylalanine, tyrosine, dihydroxy-phenylalanine, tryptophane, arginine, lysine, ornithine, aspartic acid, asparagine, glutamic acid, glutamine, glycine, hystidine, proline, hydroxy proline, tyrosine and threonine. Since these are α-aminocarboxylic acids, they can be illustrated by the following formula:

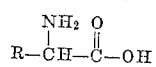

wherein R is the residue remaining of the α-amino acids described above.

The reaction of the N-acyl amino acid or N-acyl peptide with the N,N'-carbonyldiimidazoles should be effected in a suitable liquid reaction medium. The liquid should be substantially dry as water interferes with the reaction, but otherwise the particular liquid is not critical except, of course, for the obvious requirement that it must not be reactve with the reagents used. In isolating the intermediate product and for further peptide synthesis, it is usually desirable to remove the solvent or liquid reaction medium. Therefore, while it is not in any way essential to the progress of the reaction, it is preferred to use inert anhydrous organic liquids which are volatile and so can be easily removed. Typical volatile inert organic liquids which give excellent results are tetrahydrofuran, glycoldimethyl ether, methylene chloride, pyridine, dimethylformamide, diethyl phosphite, etc. The invention, however, is not limited thereto.

The amount of the organic liquid is, of course, not critical though obviously sufficient should be used to produce a readily stirrable reaction medium. An excess of liquid does no harm but as it has to be removed, there is no advantage in using an amount of liquid beyond that which is sufficient to produce an easily handled reaction medium.

The temperature is not critical. Because of the great reactivity of the N,N'-carbonyldiimidazoles, low temperatures can be used, for example, room temperatures or below; for example, the reaction will proceed at —20° C. It is also possible to use temperatures above room temperature but as no improvement of significance is noted, high temperatures are not preferred and ordinary room temperature or temperatures not far removed therefrom provide the simplest and cheapest reaction conditions. There is an upper limit to the temperature because if it gets too high, some decomposition results and yields are lowered and quality suffers somewhat. With N,N'-carbonyldiimidazole, this temperature should not exceed 65° C. The effect of higher temperature begins to be felt somewhat below the upper limit and therefore for optimum results with a minimum of decomposition, it is desirable to keep the temperature as low as practical. Since the reaction velocity is so high, it is perfectly possible to get commercially desirable reaction speed at room temperatures and somewhat below. These lower temperatures, that is to say not substantially exceeding room temperature, are therefore preferred. It is an important advantage of the invention, however, that the temperature is not critical and that it is not necessary to set up elaborate equipment for precise temperature control.

Among the materials to be used in the invention are principally unsubstituted N,N'-carbonyldiimidazole and the corresponding carbonyldibenzimidazole. Yields and effectiveness in peptide synthesis of the unsubstituted imidazole are somewhat better than with the corresponding benzimidazole. This, therefore, constitutes the preferred form of the invention.

The reaction of the N,N'-carbonyldiimidazole introduces only one imidazole ring on the amino acid or peptide. In other words, the reaction produces a substantially equimolecular quantity of imidazole. The following general equation, shown for simplicity sake with a simple acylated amino acid, is as follows:

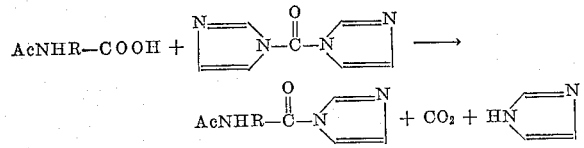

It is one of the advantages of the present invention that when the intermediate compounds are to be used in the peptide synthesis, their present field of utility, the presence of the imidazole does not interfere with the reaction and neither does the inert organic liquid. Thus in the case of a peptide synthesis, the ester of the amino acid to be added can be introduced into the reaction mixture as soon as the imidazole compound has been formed, which is noted by the ceasing of effervescence and it is not necessary to isolate the intermediate at all. This is a practical operating advantage as the peptide is more stable and shows more sharply marked characteristics than does the imidazole compound of the amino acid or peptide. Separation is therefore simpler and so in the case of the peptide synthesis, the preferred method omits any isolation or recovery of the intermediate.

When it is desired to use the intermediate for other purposes, it is simple to separate out the imidazole by a suitable selective solvent. Ordinarily, the intermediate, even if isolated, does not require maximum or complete purity and so even when isolated it is ordinarily desirable to omit expensive purification as the intermediate, even if contaminated with small amounts of free imidazole, is just as satisfactory a reagent for other syntheses as would be the completely pure compound.

After peptide synthesis is complete, the volatile inert organic liquid used in the reaction medium is ordinarily removed, which can be effected by vacuum or air drying. The solid which contains the free imidazole as well as the synthesized peptide can then be treated with suitable selective media, such as, for example, aqueous hydrochloric acid and the insoluble peptide derivative separated by filtration. Further purification of the peptide may then be effected by conventional means. In some syntheses, the peptide produced may itself be used as a reagent in the syntheses of more complicated peptides. In such cases, the presence of the free imidazole does not interfere and purification may not be necessary or a simpler purification may be used.

In the peptide synthesis, the amounts of reagents are of some significance. Best results are obtained with substantially equimolecular proportions. An excess of the N,N'-carbonyldiimidazole has a slight adverse effect on the purity of the resulting products and ordinarily, therefore, it is preferred to operate with substantially equimolecular proportions of the reagents. While this is preferred, the invention is not limited thereto as effects on purity are not serious where the excess of one reagent is not great.

The invention will be described in greater detail in conjunction with the specific examples in which the parts are by weight unless otherwise specified. The amounts of the inert solvents will be normally given in parts by volume, it being understood that these are corresponding parts, that is to say when the weight is in grams the volume parts are in cc., etc.

*Example 1*

2.09 parts of carbobenzoxyglycine was dissolved in 25 parts by volume of dry tetrahydrofuran and 1.62 parts of N,N'-carbonyldiimidazole added. The reaction mixture was maintained at room temperature until effervescence ceased and then 2.09 parts of ethyl-L-tyrosinate was added. The reaction proceeded rapidly and when complete, the tetrahydrofuran was removed by air drying and 50 parts of 1 N hydrochloric acid added. The solution was then cooled until precipitation took place, the precipitate removed by filtration and washed with water. Thereupon, the precipitate was triturated with 25 parts of a 5% aqueous sodium bicarbonate solution, again filtered and again washed with water. A high yield (88%) was obtained and the product was purified by recrystallization from 50% ethanol. The compound corresponds in melting point to ethyl carbobenzoxyglycyl-L-tyrosinate. The overall yield of pure product was in excess of 80%.

*Example 2*

A solution of 2.53 parts of tertiarybutyloxycarbonyl-L-phenylalanine in 20 parts by volume of tetrahydrofuran was treated with 1.62 parts of N,N'-carbonyl-diimidazole. The reaction mixture was maintained at 15° C. until effervescence ceased whereupon 1.03 parts of freshly distilled ethyl glycinate was added. The reaction proceeded rapidly and on completion the solvent was removed by air drying and 50 parts of 1 N hydrochloric acid added. An oily layer formed which was separated and crystallized on standing. The crystals were collected, washed with water and then with 20 parts of 5% aqueous sodium bicarbonate followed by a second water wash. An 84% yield of ethyl tertiarybutyloxycarbonyl-L-phenylalanylglycinate was obtained and was purified by crystallization from petroleum ether. The yield of pure product was 78%.

*Example 3*

2.09 parts of carbobenzoxyglycine in 10 parts by volume of dry tetrahydrofuran was reacted at 20° C. with 1.62 parts of N,N'-carbonyldiimidazole. When the effervescence ceased, a solution of an equimolecular quantity of ethyl-DL-phenylalaninate dissolved in tetrahydrofuran was added. The reaction proceeded rapidly and on completion the mixture was air dried and then treated with 50 parts of 1 N hydrochloric acid. The oil layer was separated and on cooling solidified. The solid was recovered by filtration, triturated first with water and then with a 5% aqueous sodium bicarbonate solution and finally again with water. An 83% yield of ethyl carbobenzoxyglycyl-DL-phenylalaninate was obtained which was recrystallized from petroleum ether yielding 80% of pure product.

The experiment was repeated using ethyl DL-phenylalaninate hydrobromide. Substantially the same yield of pure product was obtained.

*Example 4*

2.09 parts of carbobenzoxyglycine was dissolved in 10 parts by volume of dry tetrahydrofuran and reacted at 5° C. with 1.62 parts of N,N'-carbonyldiimidazole. After effervescence stopped, a solution of 1.74 parts of DL-phenylalanine in 10 parts of 1 N aqueous sodium hydroxide was added. The reaction proceeded rapidly. After completion, 50 parts of 1 N aqueous hydrochloric acid were added. An oily liquid formed which was separated and crystallized on standing. The product, carbobenzoxyglycyl-DL-phenylalanine was collected, washed with water and dried, giving a yield of about 70%. On purification by crystallization from 35 parts of 50% aqueous ethanol, a pure product was obtained.

The experiment was repeated replacing the sodium salt of DL-phenylalanine with a corresponding sodium salt of L-phenylalanine. A pure product was obtained in slightly lower yield.

It will be noted that the sodium salts of the amino acid give slightly inferior yields to the esters when based on pure product or, to put it another way, the crude product obtained is not as pure as with the ester.

*Example 5*

2.95 parts of phthaloyl-DL-phenylalanine were dissolved in 10 parts by volume of dry tetrahydrofuran and 1.26 parts of N,N'-carbonyldiimidazole added. The reaction mixture was heated rapidly to the boil (about 65° C.) and cooled. Ethyl glycylglycinate hydrochloride in equally molecular amounts, 1.97 parts, were then added and the mixture quickly heated again. On cooling to room temperature, 1 N hydrochloric acid was added as in the previous examples. An 80% yield of very crude material was obtained. On recrystallization from benzene petroleum ether mixture, a somewhat purer product was obtained in 56% yield.

*Example 6*

A solution of 2.23 parts of carbobenzoxy-L-alanine in 10 parts by volume of dry tetrahydrofuran was reacted at 25° C. with 1.62 parts of N,N'-carbonyldiimidazole. After the effervescence ceased, 1.4 parts of ethyl glycinate hydrochloride was added. The reaction proceeded rapidly and on completion the solvent was removed by air stream. 50 parts of 1 N aqueous hydrochloric acid was added producing an oily layer which on separation gradually solidified. The solid was recovered, washed with water, 5% aqueous sodium bicarbonate and again with water. A 75% yield of ethyl carbobenzoxy-L-alanylglycinate was obtained. This was purified by recrystallization from an ethyl acetate petroleum ether mixture.

*Example 7*

2.0 parts of carbobenzoxyglycine was dissolved in 10 parts by volume of tetrahydrofuran and reacted at 25° C. with 1.62 parts of N,N'-carbonyldiimidazole. When the effervescence stopped, 1.96 parts of ethyl L-leucinate hydrochloride was added. The reaction proceeded rapidly and on completion the solvent was removed with an air stream. 50 parts of 1 N aqueous hydrochloric acid were then added giving an oily liquid which was separated by taking up in three 50 part portions of ether. The combined ether extracts were washed with 20 parts of a 5% aqueous sodium bicarbonate solution and then with water. Concentration under vacuum gave an oily liquid which was dissolved in 10 parts by volume of ethanol and then treated with 20 parts of aqueous 1 N sodium hydroxide solution. The solution was filtered, diluted with 30 parts of water, acidified with 20 parts of 1 N hydrochloric acid and cooled. The solid precipitated out which was separated, representing a 78% yield of carbobenzoxyglycyl-L-leucine. This product was purified from an ethyl acetate petroleum ether resulting in a pure product.

*Example 8*

The procedure of Example 1 was repeated but with an increased amount of N,N'-carbonyldiimidazole, namely, 1.85 parts representing an excess over equimolecular quantities of about 11.5%. The final yield after more extensive purification including recrystallization from chloroform and absolute ethanol and petroleum ether, was about 67% and the product had a wider melting range. It is apparent, therefore, that an excess of reagent is undesirable, although the process is still practical.

*Example 9*

2.09 parts of carbobenzoxyglycine was dissolved in 10 parts by volume of tetrahydrofuran and reacted at 30° C. with 1.62 parts of N,N'-carbonyldiimidazole. After effervescence ceased, 1.4 parts of ethyl glycinate hydrochloride was added. The reaction proceeded rapidly and when complete, 50 parts of 1 N aqueous hydrochloric acid was added and the mixture cooled overnight after separating the oily layer. Crystallization took place, the crystals were recovered by filtration, washed first with water, then with 20 parts of a 5% aqueous sodium bicarbonate solution and finally again with water. A 74% yield of ethyl carbobenzoxyglycylglycinate was obtained and the product was purified by recrystallization from 50% aqueous ethanol. The resulting product has a melting point coinciding exactly with pure ethyl carbobenzoxyglycylglycinate.

The process was repeated except that 1.1 parts of dried and redistilled triethylamine was added before the addition of the ethyl glycinate hydrochloride. The yield dropped to just under 60%.

*Example 10*

A number of solvents were tried for their effectiveness in the production of carbobenzoxyglycyl-L-tyrosinate. In each case, 2.09 parts of carbobenzoxyglycyl were dissolved in 10 parts by volume of the various solvents listed below and 1.71 parts of 95% pure N,N'-carbonyldiimidazole were added. The reaction mixture was maintained at 25° C. and continued until effervescence had completely stopped. Then 2.09 parts of ethyl L-tyrosinate were added with gentle agitation. The reaction proceeded rapidly and after completion, 50 parts of 1 N aqueous hydrochloric acid were added. In the case of pyridine, an additional 10 parts of concentrated hydrochloric acid was used in order to neutralize the basicity of the solvent. In the case of the methylene chloride, it was removed by air before the addition of the aqueous hydrochloric acid. In each case, the products were purified by solution in 25 parts by volume of 60% aqueous ethanol and allowing to stand overnight at room temperature. Five parts of water were then added and the precipitates were then collected by filtration and washed with 10 parts of water. The combined filtrate and water in each case was cooled to minus 20° C. and a further crop of crystals of ethyl carbobenzoxyglycyl-L-tyrosinate were recovered. The two crops were combined. The results appear in the following table:

| Solvent | ethyl carbobenzoxy-glycyl-L-tyrosinate | |
|---|---|---|
| | Crude yield (percent) | Pure yield (percent) |
| Tetrahydrofuran | 81 | 71 |
| Dimethoxyethane | 78 | 67 |
| Methylene chloride | 84 | 78 |
| Pyridine | 78 | 74 |
| Dimethylformamide | 79 | 66 |
| Diethylphosphite | 80 | 73 |

It will be apparent that while the solvents gave slightly different yields, they all gave high yields and the nature of the solvent is therefore not of real criticality.

*Example 11*

A mixture of 23.6 parts of benzimidazole and 400 parts by volume of freshly dried benzene were warmed. The benzimidazole did not dissolve completely but the remaining suspension was maintained uniform with suitable agitation. 4.95 parts of phosgene was slowly bubbled through the mixture which was then allowed to cool to room temperature to insure crystallization of the hydrochloride of benzimidazole. The mixture was warmed and the undissolved hydrochloride was filtered off. Cooling of the filtrate caused crystallization of N,N'-carbonyldibenzimidazole.

2.09 parts of carbobenzoxyglycine were dissolved in 10 parts by volume of dry tetrahydrofuran and reacted at 25° C. with 2.62 parts of N,N'-carbonyldibenzimidazole. Effervescence did not take place. At this point, the solution was not clear and an additional 10 parts by volume of tetrahydrofuran was added and the mixture heated under reflux until solution was complete. Then 1.93 parts of ethyl-DL-phenylalaninate was added and the reaction mixture warmed until complete. It should be noted that in the case of the benzimidazole compound, the reactivity at low temperatures is not as high as with the imidazole compound which is the reason for the higher temperature. Fifty parts of aqueous 1 N hydrochloric acid was added, the reaction mixture cooled to room temperature and the precipitate which came out recovered by filtration. The precipitate was washed first with water, then with 5% aqueous sodium bicarbonate solution and finally again with water. A 77% yield of the crude product was obtained which was purified by recrystallization from ethyl acetate and petroleum ether and then from benzene and petroleum ether. The yield dropped to just under 70% of ethyl carbobenzoxyglycyl-DL-phenylalaninate which was fairly pure although showing a melting point range of 89.5° C.–91° C. instead of 90° C.–91° C. for the product of Example 3.

*Example 12*

2.09 parts of carbobenzoxyglycine and an equivalent amount of N,N'-carbonyldiimidazole were dissolved in 12.5 parts of anhydrous ether. Evolution of $CO_2$ started and the mixture was permitted to react until the evolution stopped. This resulted in the mixture setting up to a solid mass. The amount of solvent, however, was sufficient to dissolve the imidazole formed and the reaction mixture was filtered and the residue washed with three 5 part portions of anhydrous ether. An approximately 95% yield of snow-white crystals of carbobenzoxyglycine imidazolite was obtained.

*Example 13*

N,N-carbonyldiimidazole (1.62 parts) was added to a solution of 2.99 parts of carbobenzoxy-L-phenyl-alanine in 10 parts of tetrahydrofuran. When the effervescence had subsided, 2.09 parts of ethyl L-tyrosinate was added. After 30 minutes, 50 parts of 1 N hydrochloric acid was added and the mixture cooled and scratched giving 4.21 parts (86%) of an amorphous material, melting point 128–137° C. The material was boiled with 55 parts of 55% ethanol. Part of the material was insoluble. This was filtered off; cooling the filtrate gave 3.16 parts, melting point 144–154° C. The product was obtained as a gel from ethanol-water, melting point 152–158° C. It gelled out of benzene giving 2.82 parts, melting point 150–158° C. Cooling a solution of the material in 50 ml. of hot 50% ethanol gave 2.78 parts of an amorphous ethyl carbobenzoxy-L-phenylalanyl-L-tyrosinate, melting point 158–160° C., yield 57%.

*Example 14*

A solution of 2.66 parts of carbobenzoxy-L-asparagine in 10 parts tetrahydrofuran and 7 parts of diethylphosphonate was treated with 1.71 parts (95% pure) of N,N'-carbonyldiimidazole. When the foaming stopped, 3.23 parts of benzyl glycinate benzenesulfonate was added. After standing overnight, 100 parts of 0.5 N hydrochloric acid was added to the mixture. A precipitate immediately formed. This was filtered, washed with water, triturated with 20 parts of saturated bicarbonate solution, again washed with water and finally dried. The product, benzyl carbobenzoxy-L-asparaginylglycinate, weighed 2.15 parts (52% crude yield), melting point 170–182° C. Three recrystallizations gave 1.44 parts, melting point 177–179° C., yield 35%. The literature gives a 50% crude yield of material melting at 181–183° C. after recrystallization from water.

*Example 15*

The solution resulting from the reaction of 1.71 parts of trifluoroacetylglycine in 10 parts of tetrahydrofuran with 1.74 parts (93% pure) N,N'-carbonyldiimidazole was permitted to stand for an hour. Then 1.71 parts of t-butyl-L-prolinate was added. After standing overnight, the solvent was removed under vacuum and the residual yellow oil triturated with 35 parts of N hydrochloric acid. The product, t-butyl trifluoroacetylglycyl-L-prolinate, crystallized readily. The colorless solid was collected, triturated with water and dried, giving 1.70 parts (53%), melting point 89–90° C. One recrystallization from methylcyclohexane gave 1.65 parts (51% yield) of material, melting point 90–91° C.

*Example 16*

The sodium methoxide solution from 1.38 parts of sodium and 50 parts of reagent methanol was added to a solution of 7.26 parts of methyl-L-histidinate dihydrochloride in 75 parts of methanol (prepared by boiling then quickly cooling). After a few minutes, several volumes of ether were added and the sodium chloride filtered off. The filtrate was concentrated, dissolved in 50 parts of chloroform and reconcentrated. The latter was repeated a second time and the residue then subjected to high vacuum for an hour. Meanwhile 8.49 parts of carbobenzoxy-L-isoleucine monohydrate in 15 parts of tetrahydrofuran was treated with 10.68 parts (91%) of N,N'-carbonyldiimidazole. The mixture was warmed until a clear solution resulted. It was then stirred for 15 minutes and the amine added. Considerable warming resulted. After standing overnight it was poured into 200 parts of water containing 10 parts of concentrated ammonia. The product slowly crystallized. Filtration and drying gave 7.28 parts (58%) of material softening at 145, melting point 165–175° C. The product was boiled with 150 parts of methanol and some insoluble material filtered off. The filtrate was rewarmed, diluted with 50 parts of water and cooled to give 3.40 parts of product, methyl carbobenzoxy-L-isoleucyl-L-histidinate, melting point 184° C., yield 27%.

*Example 17*

After preparing a solution of 26.6 parts of carbobenzoxy-L-asparagine in 100 parts of dimethylformamide and reacting it with 16.3 parts (100% pure) of N,N'-carbonyldiimidazole at $-20\pm5°$ C., the mixture was permitted to stand at $-20°$ C. for 6 hours. Meanwhile 27.0 parts of methyl L-nitroargininate hydrochloride was dissolved in 100 parts of hot methanol, quickly cooled in an ice bath and treated with 2.30 parts of sodium in 50 parts of methanol. Ether was added and the precipitated sodium chloride filtered off. The filtrate was concentrated under vacuum, 50 parts of chloroform added to the residue and the solution reconcentrated. The residual oil was held under vacuum for 2 hours, then dissolved in 25 parts of dimethylformamide and added to the reaction mixture from above. After a few minutes at $-20°$ C., the solution was permitted to warm to room temperature slowly and then stand overnight. The solvent was removed at 60–70° C./1 mm. and the residue treated with 100 parts of boiling water. On cooling a solid formed. The solution was made more basic with sodium bicarbonate and filtered. The colorless solid thus obtained was triturated with 1 N hydrochloric acid, washed with ice water and dried to give 34.2 parts (71%) of material, melting point 179–183° C. Recrystallization from 1500 parts of boiling water using charcoal and gravity filtration gave on cooling 25.9 parts (54%), melting point 180–183° C. of product, methyl carbobenzoxy-L-asparaginyl-L-nitroargininate.

*Example 18*

The solutions were prepared, one of 2.3 parts of sodium in 50 parts of methanol and another of 12.1 parts of methyl L-histidinate dihydrochloride in 125 parts of hot methanol. The hydrochloride solution was quickly cooled and the base added. Using vacuum, the methanol was removed after filtering off 4.8 parts of salt. The residue was taken up in chloroform and 3.1 parts of brown material filtered off. Applying high vacuum for an hour gave an oil. Simultaneously 9.60 parts of t-butyloxycarbonyl-L-isoleucine hemihydrate in 40 parts of dry tetrahydrofuran was treated with 11.04 parts (88% pure) N,N'-carbonyldiimidazole. When the effervescence stopped the residual amino acid ester from above was added using 10 parts of tetrahydrofuran to transfer it. After standing for 1 hour, the solvent was removed under vacuum, 170 parts of water and 5 parts of concentrated ammonia were added. An immediate precipitate of product came down. This was cooled and filtered giving a crude yield over 100%, melting point 162–165° C. The product, methyl t-butyloxy carbonyl-L-isoleucyl-L-histidinate, was dissolved in 200 parts of methanol, filtered and reheated followed by the addition of 240 parts of water. Cooling slowly gave 12.3 parts (81% yield) of long needles, melting point 168.5–170° C.

*Example 19* t-Butyloxycarbonyl-L-proline (10.75 parts) was dissolved in 50 parts by dry tetrahydrofuran and 8.9 parts (91% pure) N,N'-carbonyldiimidazole added. The foaming subsided and the solution was permitted to stand for 1 hour. A solution of 8.95 parts of freshly distilled methyl L-phenylalininate in 10 parts of tetrahydrofuran was added and the reaction solution permitted to stand overnight. The solution was concentrated under vacuum. An ethereal solution of the residue was extracted with saturated aqueous sodium bicarbonate, 1 N hydrochloric acid and then water. The organic layer was dried over anhydrous sodium sulfate and concentrated. The residue crystallized giving 18.28 parts (98%), melting point 72–75° C. Recrystallization from 50 parts isopropyl ether gave 13.46 parts (72%) dipeptide, methyl t-butyloxycarbonyl-L-proyly-L-phenylalaninate.

*Example 20*

In a weighed flask 16.80 parts of t-butyloxycarbonyl-L-isoleucyl-L-histidine monohydrate was heated on a steam cone under high vacuum. After 45 minutes 0.50 part of water had been lost (0.40 theoretical) and the hemihydrate remained. It was dissolved in 40 parts of dimethylformamide and cooled to −40° C. N,N'-carbonyldiimidazole (10.58 parts, 100% pure) was added and the temperature maintained between −20° and −15° C. for 4 hours. During this time 15.5 parts of methyl L-prolyl-L-phenylalaninate was dissolved in 750 parts of methylene chloride. Ammonia was bubbled through for 10–15 minutes. The cloudy mixture was filtered through diatomaceous earth and the filtrate concentrated under vacuum. The crystalline residue was taken up in 25 parts of tetrahydrofuran and added to the reaction mixture above. After a few minutes the mixture was permitted to warm to room temperature where it stood overnight. The solvents were removed under vacuum giving an oil. This was taken up in chloroform, washed with water and the organic layer dried over sodium sulfate (anhydrous). The solution was concentrated, the residue dissolved in carbon tetrachloride and precipitated with petroleum ether to give a solid melting point 56–95° C., weight 21.4 parts. A second fraction of 1.6 parts, melting point 40–89° C. was extracted from the water used to wash the chloroform solution. The combined fractions were dissolved in chloroform and eluted from 400 parts of alumina in a column with 6 portions of 250 parts of chloroform, 5–250 parts portions of ½% methanol in chloroform, 5–250 parts portions of 1%, 2–250 parts portions of 1.5%, 2–250 parts portions of 2%, 250 parts of 3% and 250 parts of 5% methanol in chloroform. The effluent was cut into 250 part portions which were concentrated separately. Cuts 6 through 23 were combined, and reprecipitated from carbontetrachloride and petroleum ether to give 17.8 parts (64%) of amorphous tetrapeptide, methyl t-butyloxycarbonyl-L-isoleucyl-L-histidyl-L-prolyl - L - phenylalaninate, melting point 92–100° C.

*Example 21*

A solution of 3.56 parts of carbobenzoxyglycyl-L-phenylalanine [having a melting point of 127.5°–128.0° C., and an optical rotation $[\alpha]_D^{25} +38.2$ as a 5% solution in absolute ethanol compared with values of melting point 127.5° C. and $[\alpha]_D^{24} +38.8 \pm 0.5$ as a 5% solution in absolute ethanol as disclosed in J. Am. Chem. Soc. 80, 2902 (1958)] in 10 parts of dried dimethylformamide was cooled to −10° C. and 1.65 parts (based on 98% purity) of N,N'-carbonyldiimidazole was added. When the slow effervescence stopped, 1.03 parts of freshly-distilled ethyl glycinate was added. The reaction solution was allowed to warm to room temperature and allowed to stand 15–30 minutes. Then 50 parts of 1 N hydrochloric acid was added. When the oily liquid thus formed solidified, it was washed with 20 parts of a 5% sodium bicarbonate solution and with water. On drying, 4.22 parts (96% yield) with a melting point of 115.5°–117.0° C. was obtained. The product was dissolved in 210 parts of absolute ethanol to give a 2% solution. After cooling to 0° C., the solution was seeded with a crystal of ethyl carbobenzoxyglycyl-DL-phenylalanylglycinate. Fractions were cut as follows:

| No. | Time (hours) | Wt. (parts) | M.P. (° C.) |
|---|---|---|---|
| 1 | 3 | 0.0091 | |
| 2 | 6 | 0.097 | 120.0–133.5 |
| 3 | 10 | 0.0214 | 119.0–128.5 |
| 4 | 24 | 2.3201 | 118.5–119.5 |
|  |  |  | 119.8–120.1 |
| Concentrated | | 1.4787 | 119.9–120.3 |
| Residue | | 0.3271 | |
| DL isomer | | 0.0188 | 0.45% |
| L isomer | | 3.8202 | 87% |
| Residue | | 0.3271 | |
| Material balance | | 4.1661 | |

Since the melting point of pure ethyl carbobenzoxyglycyl-DL-phenylalanylglycinate was reported to be 132°–133° C., the percent of DL tripeptide is estimated from the melting points to be much less than 0.5 percent.

We claim:

1. A method of preparing peptides which comprises contacting at a temperature within the range of −20° C. to 65° C. substantial equal molecular quantities of a member of the group consisting of carbobenzoxy, tertiary butyloxycarbonyl, trifluoroacetyl and phthaloyl amino substituted naturally occurring α-amino carboxylic acids and dipeptides of said amino carboxylic acids with N,N'-carbonyl diimidazole in an anhydrous organic solvent inert to the reactants and without isolating the N-substituted imidazole, contacting at a temperature within the range of −20° C. to 65° C. the reaction mixture with a substantially equal molecular quantity of a member of the group consisting of lower alkyl esters of naturally occurring α-amino carboxylic acids, alkali metal salts of naturally occurring α-amino carboxylic acids and dipeptides lower alkyl esters of said amino carboxylic acids.

2. The process according to claim 1 in which the temperature does not exceed approximately room temperature.

3. The process according to claim 1 in which the naturally occurring α-amino acid is substituted with a carbobenzoxy on the amino radical.

4. The process according to claim 1 in which the naturally occurring α-amino acid is substituted on the amino group with tertiary butyloxy carbonyl.

5. The process of preparing ethyl carbobenzoxyglycyltyrosinate which comprises contacting carbobenzoxyglycine at a temperature within the range of −20° C. to 65° C. with a substantially equal molecular quantity of N,N'-carbonyldiimidazole in an anhydrous organic solvent inert to the reactants and subsequently contacting at a temperature within the range of −20° C. to 65° C. substantially equal molecular quantities of the resulting product and ethyl tyrosinate and recovering said compound therefrom.

6. The process of preparing ethyl tertiary butyloxycarbonyl-phenylalanylglycinate which comprises contacting tertiarybutyloxycarbonylphenylalanine at a temperature within the range of −20° C. to 65° C. with a substantially equal molecular quantity of N,N'-carbonyldiimidazole in an anhydrous organic solvent inert to the reactants and subsequently contacting at a temperature within the range of —20° C. to 65° C. substantially equal molecular quantities of the resulting product and ethyl glycinate and recovering said product therefrom.

7. The process of preparing ethyl carbobenzoxyglycylglycinate which comprises contacting at a temperature within the range of —20° C. to 65° C. substantially equal molecular quantities of carbobenzoxyglycine and N,N'-carbonyldiimidazole in an anhydrous solvent inert to the reactants, subsequently contacting at a temperature within the range of —20° C. to 65° C. substantially equal molecular quantities of the resulting product and ethyl glycinate and recovering said compound therefrom.

8. The process of preparing methyl t-butyloxycarbonyl-L-isoleucyl-L-histidinate which comprises contacting at a temperature within the range of —20° C. to 65° C. substantially equal molecular quantities of t-butyloxycarbonyl-L-isoleucine and N,N'-carbonyldiimidazole in an anhydrous solvent inert to the reactants subsequently contacting at a temperature within the range of —20° C. to 65° C. substantially equal molecular quantities of the resulting product and methyl histidinate and recovering said compound therefrom.

9. The process of preparing methyl t-butyloxycarbonyl-L-prolyl-L-phenylalaninate which comprises contacting at a temperature within the range of —20° C. to 65° C., substantially equal molecular quantities of t-butyloxycarbonyl-L-proline and N,N'-carbonyldiimidazole in an anhydrous solvent inert to the reactants, subsequently contacting at a temperature within the range of —20° C. to 65° C. substantially equal molecular quantities of the resulting product and methyl-L-phenylalaninate and recovering said compound therefrom.

10. The process of preparing methyl t-butyloxycarbonyl-L-isoleucyl-L-histidyl - L - proline-L-phenylalaninate which comprises contacting at a temperature within the range of —20° C. to 65° C., substantially equal molecular quantities of t-butyloxycarbonyl-L-isoleucyl-L-histidine and N,N'-carbonyldiimidazole in an anhydrous solvent inert to the reactants, subsequently contacting at a temperature within the range of —20° C. to 65° C. substantially equal molecular quantities of the resulting product and methyl-L-prolyl-L-phenylalaninate and recovering said compound therefrom.

References Cited in the file of this patent
UNITED STATES PATENTS
2,938,892    Sheehan _____ May 31, 1960